United States Patent
Naguib et al.

(10) Patent No.: US 6,901,795 B2
(45) Date of Patent: Jun. 7, 2005

(54) OSCILLATING HOT WIRE OF HOT FILM FLOW SENSOR

(75) Inventors: Ahmed Mostafa Naguib, Whitmore Lake, MI (US); Yongxiang Li, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 10/494,410

(22) PCT Filed: Oct. 22, 2002

(86) PCT No.: PCT/US02/33914

§ 371 (c)(1),
(2), (4) Date: Apr. 28, 2004

(87) PCT Pub. No.: WO03/038381

PCT Pub. Date: May 8, 2003

(65) Prior Publication Data

US 2004/0237645 A1 Dec. 2, 2004

Related U.S. Application Data

(60) Provisional application No. 60/340,649, filed on Oct. 30, 2001.

(51) Int. Cl.$^7$ .................................................. G01F 1/68
(52) U.S. Cl. .................................................. 73/204.27
(58) Field of Search .......................... 73/204.27, 204.26

(56) References Cited

U.S. PATENT DOCUMENTS

| 4,471,655 A | * | 9/1984 | Obayashi et al. | ........ 73/204.27 |
| 4,604,895 A | * | 8/1986 | Watkins | .................... 73/204.27 |

* cited by examiner

*Primary Examiner*—Edward Lefkowitz
*Assistant Examiner*—Jewel Thompson
(74) *Attorney, Agent, or Firm*—Foster, Swift, Collins & Smith, P.C.

(57) ABSTRACT

This invention is a flow measurement device that has high spatial (less than 1.0×1.0 mm$^2$) and temporal resolution (greater than 10 s to 100 s kHz) to measure flow properties in unsteady and direction-reversing conditions. The present invention can have an oscillating substrate, hot wire prongs, a hot wire attached to the hot wire prong, sensor leads from the prongs to a constant temperature anemometry circuit (CTA), means for the oscillating substrate to oscillate the substrate at a frequency greater than a characteristic cycle frequency of the flow to be measured, at a frequency less than a CTA bandwidth frequency, and such that a frequency and amplitude ($A_w$) of oscillation are sufficiently large to be detected, and means to obtain two measurements during an oscillation cycle when the hot wire is at its maximum oscillation velocity. Alternatively, the prongs can be eliminated and a hot wire or hot film can be directly applied to the oscillating substrate.

15 Claims, 3 Drawing Sheets

OSCILLATING HOT WIRE OF HOT FILM FLOW SENSOR

CROSS-REFERENCE TO RELATED APPLICATION

This application claims priority to a U.S. provisional patent application Ser. No. 60/340,649 titled, "Oscillating Hot-Wire or Hot-Film Flow Sensor," filed 30 Oct. 2001. The entire disclosure of Ser. No. 60/340,649 is incorporated herein by reference in its entirety.

FIELD OF INVENTION

The present invention relates generally to flow measurement techniques, and specifically to an oscillating hot wire sensor for measurement of unsteady, direction-reversing flow velocity and wall-sheer stress in aerodynamic and hydrodynamic applications.

BACKGROUND OF INVENTION

A common method to indirectly measure unsteady surface shear uses a "hot" wire or "hot" film on the surface and is well known in the art. Surface shear is a tangential force exerted on a surface (wall) caused by flow moving over the surface. This method determines surface shear by measuring cooling of the wire or film at the surface and comparing it to known cooling velocity values. This technique is the only known method to measure high-frequency surface shear fluctuations. In addition to only indirectly measuring surface shear, the "hot" wire or "hot" film method does not measure directional changes of the flow. To remedy the indirect nature and directional ambiguity of the prior art, surface-shear measurements via shear balances (a shear sensor that includes a strain gauge or other methods known in the art) mounted flush with the surface were developed. These devices would directionally deflect under the action of shear. Although capable of detecting direction and amount of surface shear, the bulkiness of their floating elements made them only useful for time-averaged measurements over a large area, rather than at a single point (never less than $1.0 \times 1.0$ mm$^2$).

The emergence of micro electro mechanical systems (MEMS) technology generated considerable hope in constructing micron-sized floating elements, or shuttles, with a sensing area less than $0.5 \times 0.5$ mm$^2$ and a bandwidth of tens and even hundreds of kHz (i.e., much greater temporal resolution).

The excitement over MEMS floating elements resulted in a number of attempts to construct high precision directional shear flow sensors. Although some success was achieved in constructing and testing the MEMS floating elements, one problem was soon realized. The extremely small area on which the surface shear acts can only produce Angstrom-size deflections. Thus, in order to maximize the deflection, the shuttle support could only be a few microns wide. This rendered these sensors fragile and, for all practical purposes, only useable by their makers under highly controlled conditions. Additionally, the minute deflections of the floating element within the shuttle did not seem to produce sufficient signal-to-noise ratio, particularly when using capacitive pickups known in the art for detecting the deflection.

Other attempts to remove directional ambiguity from hot wire measurements included the use of "pulsed-wire" anemometers previously used for velocity measurements in separated flows. This technology applied to measuring surface shear stress was later developed using a sensor having a central heating wire surrounded by upstream and downstream cold wires. A central wire, typically oriented at 90 degrees with respect to the sensor wires, is heated periodically. Fluid velocity is measured from the time of heating the central wire until a change in temperature is detected by one of the cold wires (time of flight). Flow direction (forward or reverse) is determined by which cold wire changes temperature.

Unfortunately, there are several difficulties and limitations using this pulsed anemometry technology. First, to avoid thermal diffusion effects, the sensing volume size is typically no less than one to two millimeters. This limits sensor spatial resolution. This sensor separation limits the frequency response to tens, or a few hundred Hz at best (i.e., low temporal resolution). Second, in flows with large velocity gradients, such as near surfaces (walls), the measurements must be corrected using constants. Finally, pulsed hot wires require elaborate and careful calibration. Again, this limits their application since they are impractical for applications involving array measurements.

A different variation on pulsed anemometry also known in the art uses three parallel wires to measure the fluid velocity in a one-dimensional pulsating flow such as in a pipe. In this approach, a central wire is operated as a conventional constant-temperature sensor and used to measure the magnitude of the velocity. Flow direction is indirectly determined by incorporating the two outside wires in opposite legs of a Wheatstone bridge to form a thermal tuft, known in the art, on the wall under a re-attachment zone of a backward facing step. Although this method overcomes some of the disadvantages of the time of flight technique, the frequency bandwidth remains limited to tens or a few hundred Hz due to separation of the thermal tuft sensors and their thermal inertia.

Thus, there remains a need to develop a flow measurement device that has high spatial (less than $1.0 \times 1.0$ mm$^2$) and temporal resolution (greater than 10s to 100s kHz) to measure fluid flow properties in unsteady and direction-reversing fluid flows.

SUMMARY OF THE INVENTION

Accordingly, a feature of the present invention is to provide a high spatial and temporal resolution sensor for measurements of unsteady direction-reversing surface shear stress produced by a fluid flow in aerodynamic and hydrodynamic applications. Another feature of the present invention is to provide a sensor that can be used for flow velocity measurements in direction reversing flows.

Specifically, the present invention is a flow measurement device that has high spatial (less than $1.0 \times 1.0$ mm$^2$) and temporal resolution (greater than 10s to 100s kHz) to measure fluid flow properties in unsteady and direction-reversing fluid flows.

The present invention can have, in a preferred embodiment, an oscillating hot wire sensor to measure flow, having an oscillating substrate, at least two conductive hot wire prongs having a first end attached to the oscillating substrate and a second end extending above the oscillating substrate, a hot wire attached and stretched across the hot wire prong second ends; sensor leads comprising first sensor lead ends and second sensor lead ends, the first sensor lead ends attached to the first hot wire ends; constant temperature anemometry (CTA) circuitry connected to the second sensor lead ends; means for the oscillating substrate to oscillate the substrate at a frequency greater than a characteristic cycle frequency of the flow to be measured, at a frequency less than a CTA bandwidth frequency, and such that a frequency and amplitude ($A_{\omega}$) of oscillation are sufficiently large to be detected; and means to obtain two measurements during an oscillation cycle when the hot wire is at its maximum oscillation velocity. Alternatively, the prongs can be eliminated and a hot wire or hot film can be directly applied to the oscillating substrate.

The oscillating hot wire prong can extend in the range of 5 to 10 microns above the substrate or protective cover (if used), the CTA bandwidth is in the range of 20–40 kHz, the frequency greater than a characteristic cycle frequency of the flow to be measured is greater than 5 kHz.

The means for the oscillating substrate can use piezoelectric or micro electro mechanical systems (MEMS) technology.

A protective cover with openings that covers the oscillating substrate, the openings allowing hot wire prong second ends to extend through the protective cover can be added.

In an alternate embodiment, a first pressure sensor is added upstream of the flow and a second pressure sensor is added downstream of the flow, whereby a pressure gradient can be determined.

Briefly summarized, the invention provides an oscillating hot sensor for measuring fluid flow which includes a substrate adapted to be mounted for oscillation in a fluid flow passage having an axis for reversible fluid flow, the axis extending between a first flow direction and a second, opposite flow direction. A hot sensor element such as a hot wire or hot film is carried by the substrate and is connected by leads to constant temperature anemometry circuitry. Means such as a piezoelectric or MEMS device is provided for oscillating the substrate between the first and second fluid flow directions. Means are embodied in the circuitry for obtaining a first velocity measurement in an oscillation cycle during flow in said first flow direction and a second velocity measurement during flow in said second flow direction and, means are also embodied in the circuitry for comparing signals representative of the first and second velocity measurements.

Other features of the present invention will become more apparent to persons having ordinary skill in the art to which the present invention pertains from the following description taken in conjunction with the accompanying figures.

DETAILED DESCRIPTION OF THE INVENTION

The present invention is a high spatial and temporal resolution sensor for measurements of unsteady direction-reversing surface (wall) shear stress produced by a fluid flow in aerodynamic and hydrodynamic applications. The flow measurement device of the present invention has high spatial (less than 1.0×1.0 mm$^2$) and temporal resolution (greater than 500 Hz up to 100s kHz) to measure fluid flow properties in unsteady and direction-reversing fluid flows.

The surface shear sensor of the present invention measures fluid flow velocity (V) with a hot wire very close to the surface. If the wire is located within the region where the velocity varies linearly with distance from the wall, the surface shear stress ($\tau_w$) can be estimated from the velocity measurement as:

$$\tau_w = \mu dV/dy(y=0) \approx \mu V/\delta y$$

where $\mu$ is the absolute viscosity, y is the direction normal to the wall, and δy is the distance from the wall to the hot wire. This technique, known in the art, measures shear stress in flows where a local velocity vector does not reverse direction.

Figure 1:
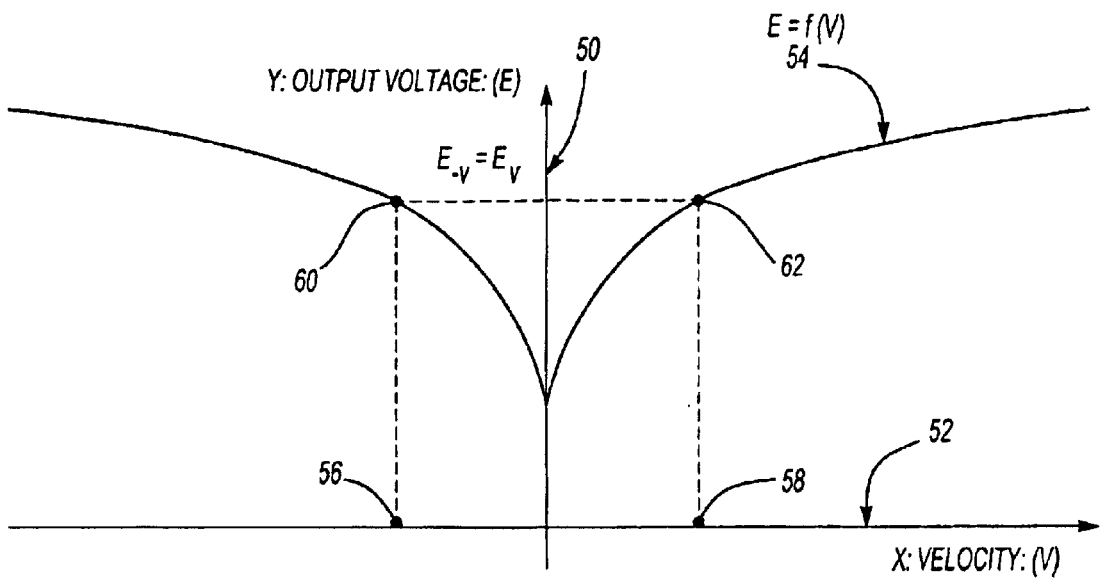
FIG. 1 illustrates a typical hot wire response curve.

FIG. 1 illustrates a typical hot wire response curve. The inability of the approach to measure the flow velocity (shear stress) and direction can be seen from a typical hot wire response curve 54. FIG. 1 has as its y-axis hot wire output voltage E 50 and flow velocity V 52 as its x-axis. At velocity −V 56 there is a corresponding output of $E_{-V}$ 60. Similarly at velocity V 58 there is a corresponding output of $E_V$ 62. As illustrated in FIG. 1, the hot wire output voltage (E) 50 remains the same if the velocity magnitude is unchanged but its direction is reversed, (i.e., $E_{-V}$ 60 equals $E_V$ 62). This gives rise to the classical directional ambiguity of hot wires.

Figure 2:
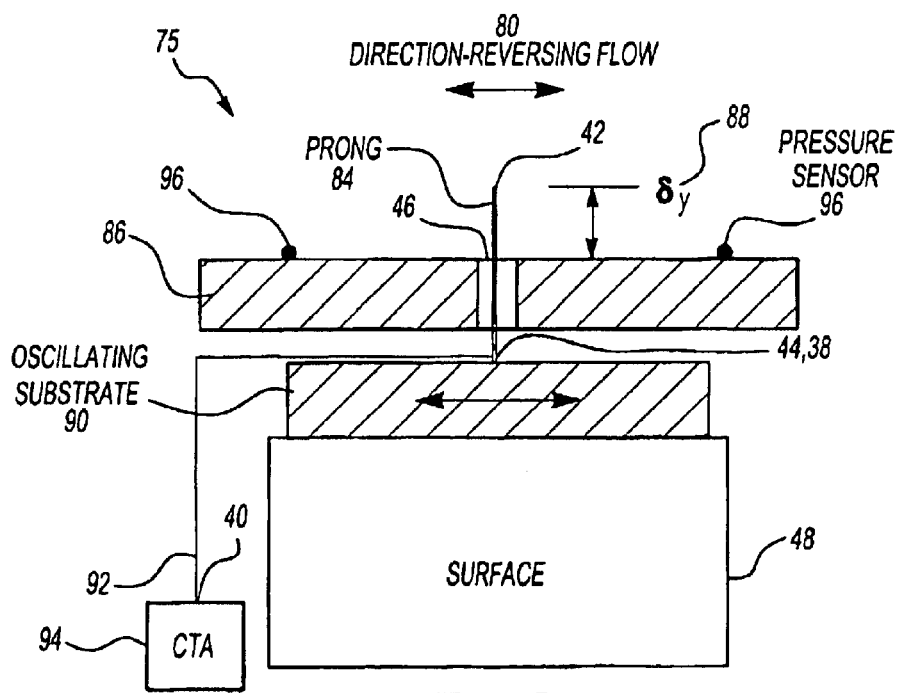
FIG. 2 illustrates a side view of the oscillating hot wire sensor of the present invention.
Figure 3:
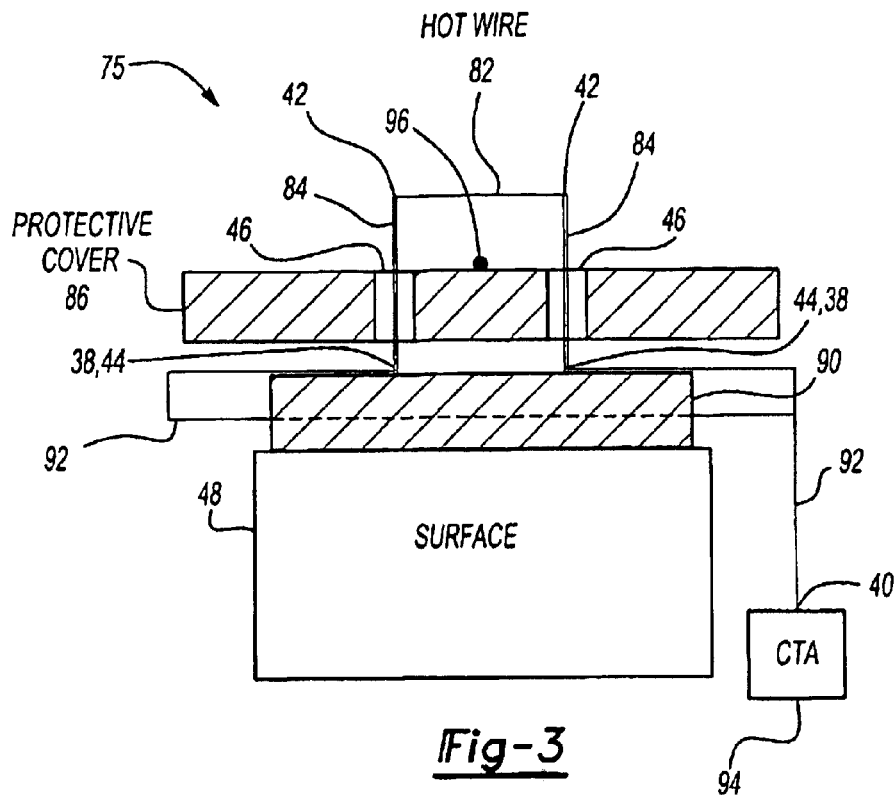
FIG. 3 illustrates an end view of the oscillating hot wire sensor of the present invention.

The present invention can overcome this directional insensitivity, by mounting a near-surface sensor 75 on an oscillating substrate 90, as shown in FIGS. 2 and 3. FIG. 2 shows a side view of the present invention, used in measurement of a direction-reversing fluid flow 80, while FIG. 3 shows an end view of the present invention. In the illustrated embodiment, an oscillating substrate 90, attached through various means known in the art to a surface 48, is covered by an optional protective cover 86. At least two conductive hot wire prongs 84 having a first end 44 and second end 42 are fixedly attached to the oscillating substrate 90, and extend through openings 46 in the protective cover 86 in the range of 5 to 10 microns above the protective cover 86. A hot wire 82 is attached and stretched across the hot wire prongs 84 second ends 42 Alternatively, one skilled in the art could substitute the hot wire 82 and the hot wire prongs 84 with a hot wire or hot film mounted directly on the oscillating substrate 90. The hot wire prongs 84 extend a distance δy 88 above the surface of the optional protective cover 86. Sensor leads 92 having first sensor lead ends 38 and second sensor leads 40, the first sensor lead ends 38 attach to the first hot wire prong end 44; and a constant temperature anemometry circuitry 94, known in the art attach to the second sensor lead ends 40.

The oscillation frequency of the new sensor, to be referred to as OHW (or oscillating hot wire), should be higher than any characteristic frequency in the flow. In this manner, two measurements of the same velocity can be made with the hot wire 82 moving with and against the flow 80 during the oscillation cycle. Each of the two measurements is preferably acquired while the hot wire 82 is at its maximum oscillation velocity (i.e., at the mid-stroke of oscillation).

Figure 4:
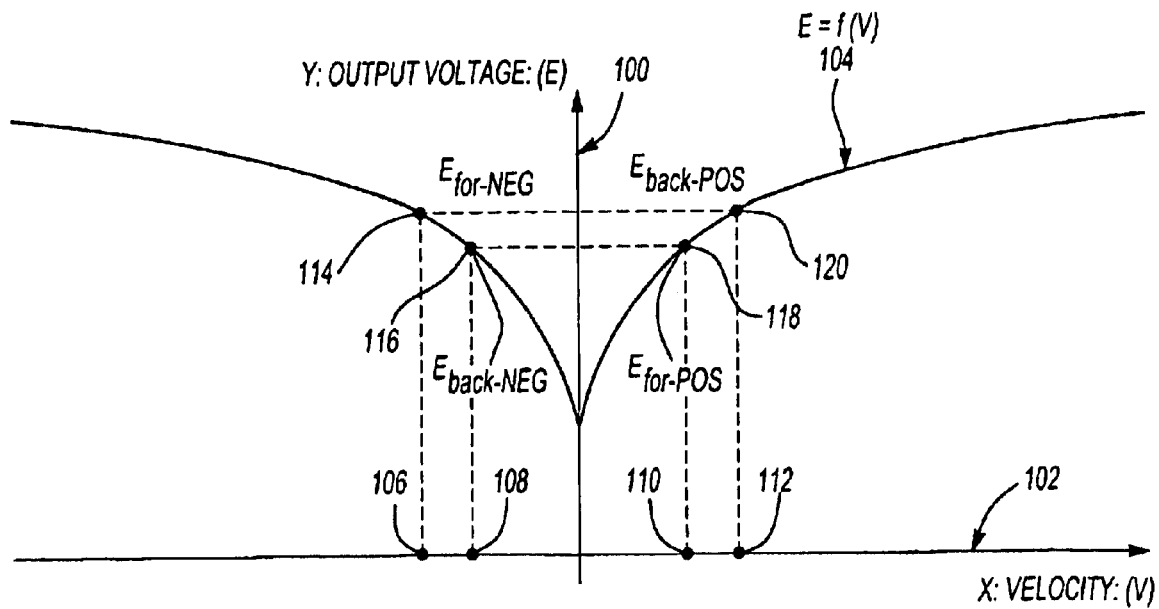
FIG. 4 illustrates a response curve of the oscillating hot wire sensor of the present invention.

To understand how the two measurements per oscillation cycle can be used to yield the local velocity magnitude and direction, consider the following analysis, illustrated in FIG. 4. FIG. 4 shows an y-axis hot wire output voltage E 100 and an x-axis flow velocity 102. A hot wire response curve is shown at 104. Let "V" be the magnitude of the local velocity and "v" be the maximum oscillation velocity of the wire. Also, assume the forward motion of the hot wire 82 oscillation is in the positive flow-velocity direction (first flow direction). When the local velocity vector is positive, the measurement with the hot wire 82 moving in the forward (with the flow) direction yields a voltage $E_{for-POS}$ 118 in response to velocity V−v 110 (since the flow velocity relative to the hot wire 82 is reduced by an amount equal to the wire velocity). Similarly, the hot wire 82 output voltage for the measurement in the backward direction ($E_{back-POS}$) 120 would result from a flow velocity of V+v 112 (because the hot wire 82 is now moving opposite to the flow direction). Since $E_{back-POS}$ 120 results from a higher flow velocity, it will be larger than $E_{for-POS}$ 118. If, on the other hand, the flow velocity is in the negative direction, $E_{back-NEG}$ 116 will be less than $E_{for-NEG}$ 114. Thus, the direction of the local velocity vector (whether it is positive or negative) can be determined from the sign of the difference: $E_{back}-E_{for}$.

When selecting the hot wire 82 oscillation frequency ($f_w$), there are three major constraints that must be considered.

First, the oscillation frequency must be higher than any characteristic frequency in the flow, such that the flow would be "frozen" during the time between the two successive measurements. A frequency of 5 kHz or higher should be sufficient for most laboratory experiments and a large number of applications.

Second, the measured oscillation frequency bandwidth must be less than the bandwidth of the hot wire 82 in order for the hot wire 82 to keep pace with the velocity oscillation. This hot wire 82 band width is determined by the CTA circuitry 94 used to operate the sensor. A typical CTA 94 bandwidth is in the range of 20-40 kHz.

Third, the frequency and amplitude ($A_w$) of oscillation should be such that the maximum wire velocity ($v=2\pi A_w f_w$) is sufficiently large to be detected. For example, if $A_w$=1 $\mu$m and $f_w$=5000 Hz, then v=0.0314 m/s. Such a velocity disturbance should be easily detected if the local velocity is 1 m/s or smaller. If one assumes the hot wire 82 location to be a few microns (preferably between 5 to 10 microns, but for this example, 5 microns) above the surface 48, then the maximum measurable shear stress in airflow (corresponding to V=1 m/s and $\mu_{air}$=1.8×10$^{-5}$ N Sec/m$^2$) is 3.6 Pa. This value can be increased by increasing the oscillation amplitude and/or frequency (while satisfying the second constraint).

Although the required frequency of oscillation (a few kHz) is too high to achieve with a conventional mechanical element, the desired frequency (and amplitude) values are well within the range attainable by resonant structures fabricated using micro electro mechanical systems (MEMS) technology or piezoelectric technology. Furthermore, MEMS technology has already been used to fabricate resonant structures as well as conventional hot wire sensors.

Therefore, the proposed sensor can be realized using MEMS or piezoelectric technology to fabricate an integrated oscillating-substrate/hot wire system that is capable of oscillating at frequencies up to tens of kHz (and more if CTA technology is improved to accommodate wider bandwidths) and amplitudes up to tens of microns. At such high frequency of oscillation the new sensor of the present invention will be capable of measuring the unsteady direction-reversing shear stress with a bandwidth of a few to tens of kHz. This is a tremendous improvement in temporal resolution as compared to pulsed-wire anemometry. Furthermore, the spatial resolution of the hot wire 82 is that of a conventional hot wire which is typically in the range of 100 to 500 $\mu$m (compared to the few millimeter sensor size in pulsed-wire anemometry). Finally, the inherent ability of MEMS and piezoelectric technology to fabricate sensor arrays will be extremely useful in extending the use of the new sensor to measurement of the surface shear stress distribution over large surface areas.

To more completely understand the disclosed invention, a brief discussion of the linearity of the mean velocity profile in the measurement zone very close to the wall is necessary. The assumed linearity is a consequence of conducting measurements at very small y values such that a Taylor series expansion of the flow velocity, known in the art, can be truncated after the first order (linear) term. However, the second-order (y$^2$) term in the expansion may become significant for flows where a strong pressure gradient is present. In such a case, the sensor measurements must be corrected for the pressure gradient (or quadratic) effects. The present invention accomplishes this by integrating the proposed sensor with two pressure sensors 96 just up and downstream of the OHW to measure the pressure gradient. That is, in its more versatile form, the new sensor includes both the oscillating wire and two pressure sensors 96. Fortunately, MEMS and piezoelectric technology have also been used to fabricate pressure sensors successfully. Thus, the full OHW system can be fabricated by integrating all components in the micro fabrication process.

Figure 5:
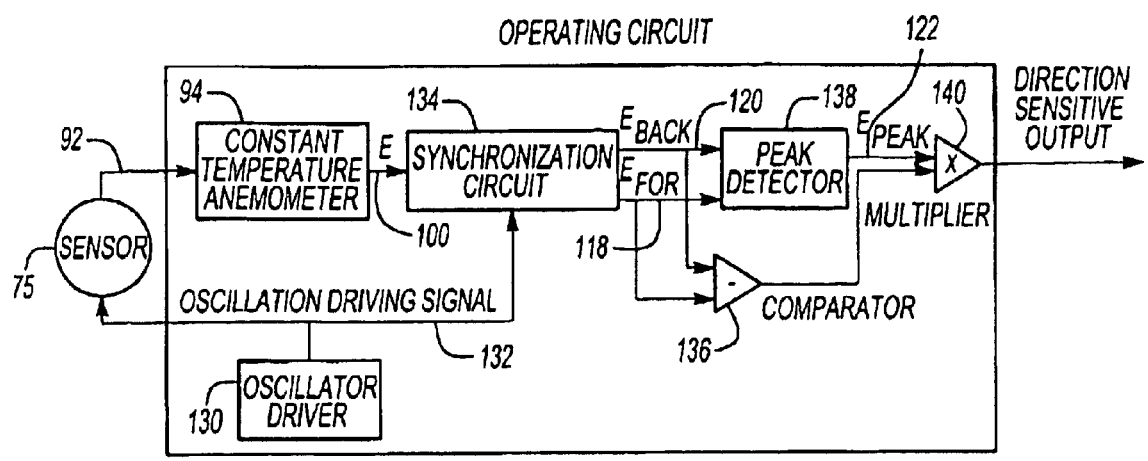
FIG. 5 is a diagram representing the operating circuit used in the apparatus of this invention.

A preferred electrical circuit used to operate the oscillating hot wire sensor 75 of this invention is illustrated diagrammatically in FIG. 5. The circuit includes the following components:

1. A CTA 94, which is the same unit as that used to operate conventional hot wires. The CTA 94 outputs a voltage E 100 that is a function of the magnitude of the measured velocity 102.

2. An oscillator driver 130, which outputs a sinusoidal (oscillation driving) signal 132 with the desired oscillation frequency, amplitude and power to cause the oscillating hot wire of sensor 75 to vibrate. The signal is also simultaneously fed to a synchronization circuit 134.

3. Synchronization circuit 134 accepts the hot wire output signal (voltage E) 100 and the oscillation driving signal 132. The synchronization circuit 134 then outputs the hot wire output voltage ($E_{for-POS}$) 118 and 120 ($E_{back-POS}$) at the two phases of the oscillation driving signal 132 corresponding to the forward and backward positions of the sensor 75. That is, for each cycle of oscillation of the wire of sensor 75, the synchronization circuit 134 outputs $E_{back-POS}$120 and $E_{for-POS}$ 118, only, and the case of flow in the negative direction output $E_{for-NEG}$ 114 and $E_{back-NEG}$ 116. In FIG. 5 readings are shown in the positive flow direction for purposes of illustration 4. A comparator 136, which subtracts $E_{for-POS}$ 118 from $E_{back-POS}$ 120 and outputs either plus or minus volts for positive and negative difference, respectively.

5. A peak detector 138, determines the larger of $E_{for-POS}$ 118 and $E_{back-POS}$ 120 for every oscillation cycle, which is equal to $E_{peak}$ 122.

6. A multiplier 140, which multiplies the output of the comparator 136 (representing either a positive or negative direction of the flow) by the larger of $E_{for-POS}$ 118 and $E_{back-POS}$ 120. In this manner, the output voltage polarity provides the direction of flow 80 and the output signal magnitude is a function of the flow velocity.

Various alterations and changes can be made to the illustrated embodiment of the present invention without departing from the spirit and broader aspects of the invention as set forth in the appended claims, which are to be interpreted in accordance with the principles of patent law, including the doctrine of equivalence. The embodiment of the invention in which exclusive property or privileges claimed is defined as follows.

We claim:

1. An oscillating hot wire sensor to measure flow, comprising:
   an oscillating substrate;
   at least two conductive hot wire prongs having a first end attached to the oscillating substrate and a second end extending above the oscillating substrate;
   a hot wire attached and stretched across the hot wire prong second ends;
   sensor leads comprising first sensor lead ends and second sensor lead ends, the first sensor lead ends attached to the first hot wire prong ends;
   constant temperature anemometry (CTA) circuitry connected to the second sensor lead ends;
   means for the oscillating substrate to oscillate the substrate
      at a frequency greater than a characteristic cycle frequency of the flow to be measured,
      at a frequency less than a CTA bandwidth frequency, and
      such that a frequency and amplitude ($A_w$) of oscillation are sufficiently large to be detected; and
   means to obtain two measurements during an oscillation cycle when the hot wire is at its maximum oscillation velocity.

2. The oscillating hot wire sensor of claim 1 wherein the hot wire prong second end extends in the range of 5 to 10 microns above the protective cover.

3. The oscillating hot wire sensor of claim 1, wherein the CTA bandwidth is in the range of 20–40 kHz.

4. The oscillating hot wire sensor of claim 1, wherein the frequency greater than a characteristic cycle frequency of the flow to be measured is greater than 5 kHz.

5. The oscillating hot wire sensor of claim 1, wherein the means for the oscillating substrate uses piezoelectric technology.

6. The oscillating hot wire sensor of claim 1, wherein the means for the oscillating substrate uses micro electro mechanical systems (MEMS) technology.

7. The oscillating hot wire sensor of claim 1, further comprising a protective cover with openings that covers the oscillating substrate, the openings allowing hot wire prong second ends to extend through the protective cover.

8. The oscillating hot wire sensor of claim 1, further comprising a first pressure sensor is added upstream of the flow and a second pressure sensor is added downstream of the flow, whereby a pressure gradient can be determined.

9. An oscillating hot wire sensor to measure flow, comprising:
   an oscillating substrate;
   a hot wire attached and stretched across the oscillating substrate;
   sensor leads comprising first sensor lead ends and second sensor lead ends, the first sensor lead ends attached to the hot wire ends;
   constant temperature anemometry circuitry connected to the second sensor lead ends;
   means for the oscillating substrate to oscillate the substrate
      at a frequency greater than a characteristic cycle frequency of the flow to be measured,
      at a frequency less than a CTA bandwidth frequency, and
      such that a frequency and amplitude ($A_w$) of oscillation are sufficiently large to be detected; and
   means to obtain two measurements during an oscillation cycle when the hot wire is at its maximum oscillation velocity.

10. An oscillating hot film sensor to measure flow, comprising:
    an oscillating substrate;
    a hot film attached and stretched across the oscillating substrate;
    sensor leads comprising first sensor lead ends and second sensor lead ends, the first sensor lead ends attached to the hot film ends;
    constant temperature anemometry (CTA) circuitry connected to the second sensor lead ends;
    means for the oscillating substrate to oscillate the substrate
       at a frequency greater than a characteristic cycle frequency of the flow to be measured,
       at a frequency less than a CTA bandwidth frequency, and
       such that a frequency and amplitude ($A_w$) of oscillation are sufficiently large to be detected; and
    means to obtain two measurements during an oscillation cycle when the hot film is at its maximum oscillation velocity.

11. An oscillating hot sensor for measuring fluid flow comprising:
    a substrate adapted to be mounted for oscillation in a fluid flow passage having an axis for reversible fluid flow, said axis extending between a first flow direction and a second, opposite flow direction;
    a hot sensor element carried by said substrate;
    constant temperature anemometry circuitry;
    leads connecting said hot sensor element to said circuitry;
    means for oscillating said substrate between said first and second fluid flow directions along said axis;
    means embodied in said circuitry for obtaining a first velocity measurement in an oscillation cycle during flow in said first flow direction and a second velocity measurement in said cycle during flow in said second flow direction; and
    a comparator operatively connected to said circuitry for comparing said first and second velocity measurements.

12. A sensor according to claim 11 wherein said hot sensor element comprises a hot wire supported on a pair of prongs carried by said substrate.

13. A sensor according to claim 11 further comprising a multiplier configured to multiply the output of said comparator.

14. A sensor according to claim 11 wherein an oscillator driver outputs a sinusoidal signal to said sensor and to a synchronization circuit which also receives the output of said anemometry circuitry.

15. A sensor according to claim 14 wherein said synchronization outputs voltage signals representing voltages at said first and second flow directions to a comparator which substracts said voltages whereby flow direction and flow velocity can be determined.

* * * * *